Figure 1:
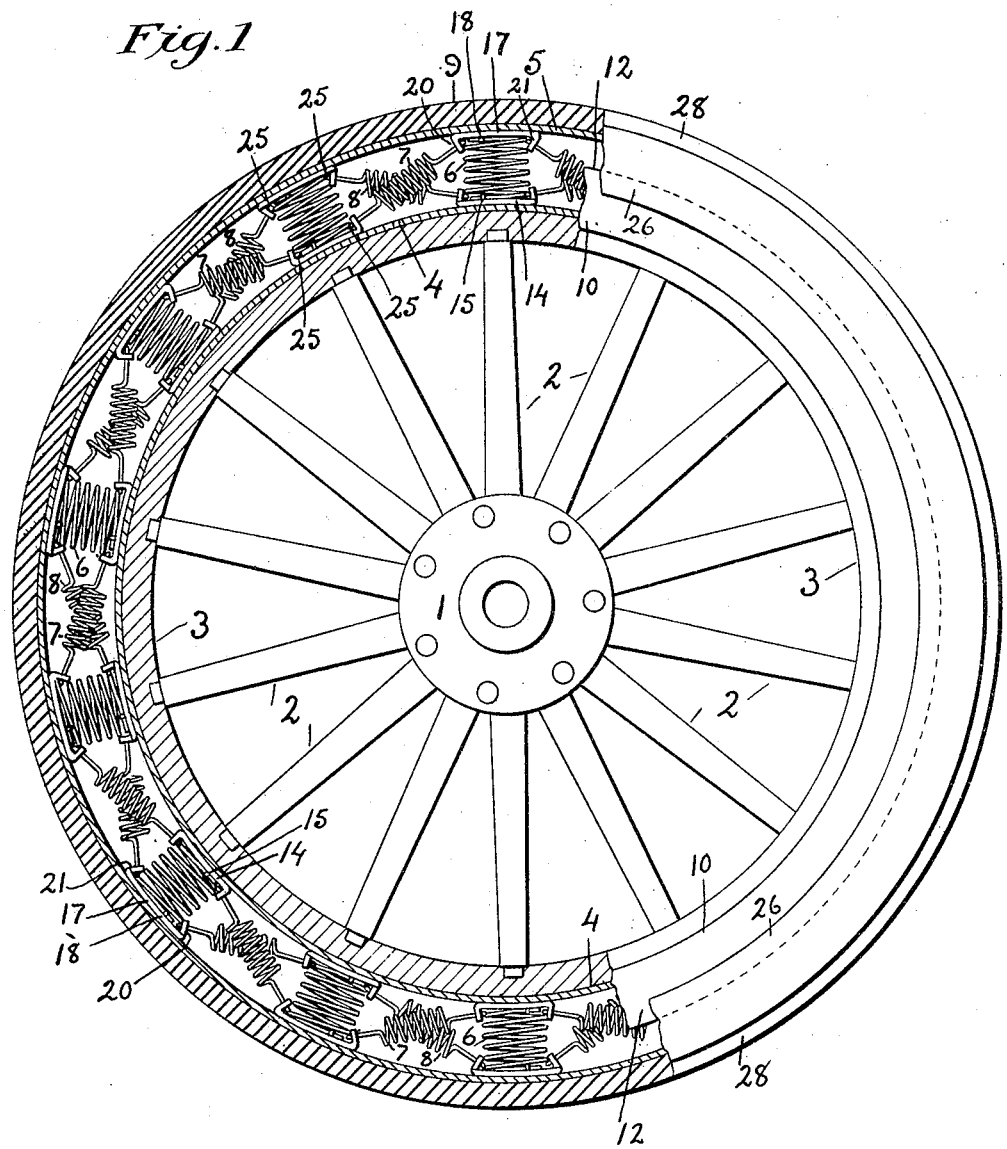

No. 877,856. PATENTED JAN. 28, 1908.
T. J. McCARTHY.
SPRING TIRE.
APPLICATION FILED MAR. 27, 1906.

2 SHEETS—SHEET 1.

Witnesses:
J. E. McGrath
Chas. D. King.

Inventor:
T. J. McCarthy
by A. H. Ste Marie
Atty.

No. 877,856.
PATENTED JAN. 28, 1908.
T. J. McCARTHY.
SPRING TIRE.
APPLICATION FILED MAR. 27, 1906.
2 SHEETS—SHEET 2.
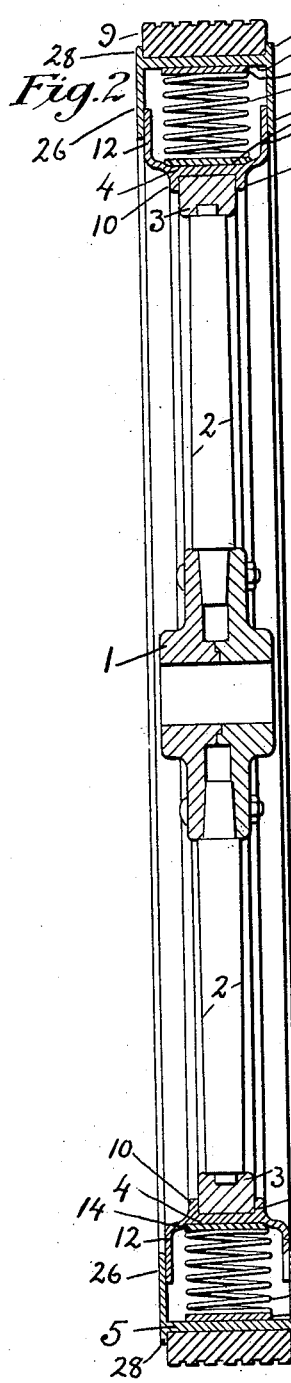
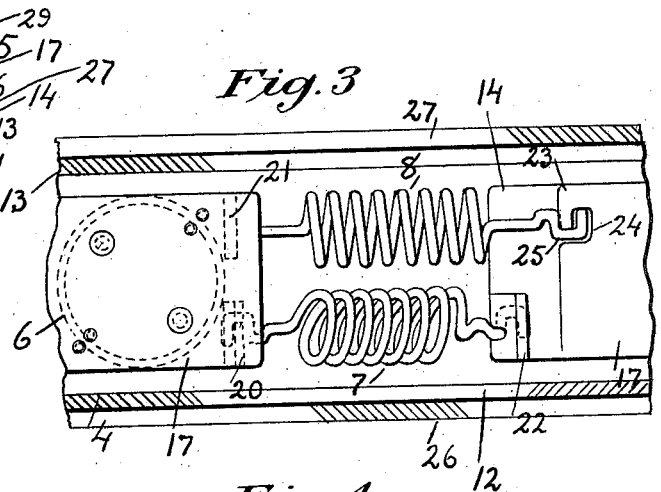
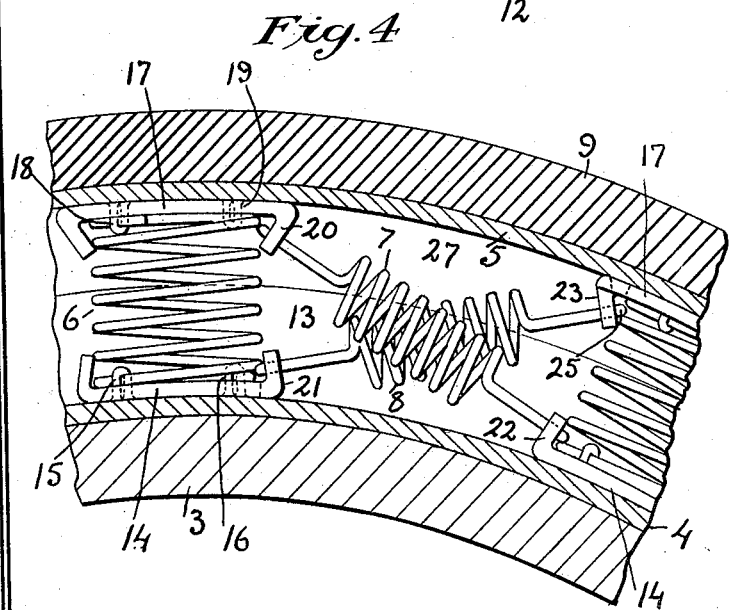
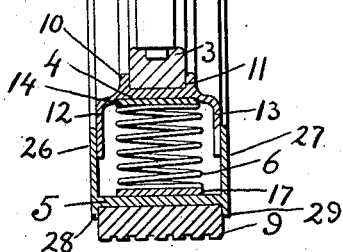
Witnesses:
J. E. McGrath
Chas. D. King.
Inventor:
T. J. McCarthy
by A. H. Ste Marie
Atty.

UNITED STATES PATENT OFFICE.

THOMAS JAMES McCARTHY, OF LOS ANGELES, CALIFORNIA.

SPRING-TIRE.

No. 877,856.   Specification of Letters Patent.   Patented Jan. 28, 1908.

Application filed March 27, 1906. Serial No. 308,197.

*To all whom it may concern:*

Be it known that I, THOMAS JAMES MC-CARTHY, a citizen of the United States of America, and a resident of the city of Los Angeles, in the county of Los Angeles and State of California, have invented a new and useful Spring-Tire, of which the following is a specification, reference being had therein to the accompanying drawings.

This invention aims to provide an improved wheel tire, which will not only be an adequate substitute for, but really will prove to be an article in every respect superior to the pneumatic rubber tire, such as is used on the automobile or horseless carriage.

Patrons of the automobile are well aware of the fact that the pneumatic rubber tires are costly and short-lived at best. They are liable to be punctured or cut up and to burst at the most inopportune moment, and for that reason, "extras" have to be carried on a journey in order to replace the ruined ones whenever occasion demands. It is estimated, by persons familiar with trade conditions, that the replacing and renovating of pneumatic tires on an automobile amount to fully twenty per cent. of the cost thereof in a single year. The need is therefore felt of a tire, other than the pneumatic, that will be durable as well as resilient, proof against punctures and cuts, and capable of withstanding rough usage to a reasonable extent. If these features be realized, with simplicity of construction and inexpensiveness of manufacture, then a practical, ideal tire is obtained. Such a tire, it is believed, the present invention affords.

Referring to the drawings,—Figure 1 is a sectional side elevation of a wheel having a tire made in accordance with the invention. Fig. 2 is a vertical cross section of the same. Figs. 3, and 4 are details, showing fragmentary parts of the tire on an enlarged scale.

In these various figures, let the numeral 1 represent the hub of the wheel; 2, its spokes; and 3, the felly. No novelty is claimed in these parts (1, 2, 3,) which may be of any approved construction.

The improved tire comprises two concentric circular bands of metal 4 and 5, an annular series of radial springs 6 therebetween, pairs of lateral springs 7 and 8 similarly-inclosed but diagonally arranged and running in opposite directions between the said radially-disposed springs, and a cushion tread 9. By preference, the said bands and intervening springs are made of steel, and the tread of solid rubber.

Within the inner band 4 are provided two narrow flanges 10 and 11, between which the felly 3 is fitted, the band thus forming a shoe therefor, and being secured thereto by any suitable fastening. Outwardly the band 4 is also formed with another pair of wider flanges 12 and 13, between which are seated the radial springs 6. These springs are conveniently made of spiral form and placed endwise upon fittings 14, consisting of small plates bent to the curvature of the periphery of the band 4 and securely bolted thereto, the inner end of each spring being threaded or passed through eyes or staples 15 and 16 on opposite sides of its respective plate or fitting and hooked to one of them. Upon the outer end of each spring 6, is placed another fitting or plate 17, having likewise oppositely-located eyes or staples 18 and 19, through which the said outer end is passed or threaded and to one of which it is hooked. This second plate or fitting is bent to the curvature of the outer band 5, as shown.

Besides the aforementioned eyes or staples 15, 16, 18, 19, the two plates or fittings 14 and 17 are further provided each with four lugs 20, 21, 22, 23, one at each corner, the same being slotted, as at 24, and adapted to receive either end of one of the springs 7 or 8. The last named springs (7 and 8) have a hook 25 at each end, which is so formed that it can be readily dropped into any one of the slots 24 and will bear equally on opposite sides of its respective lug, thereby preventing displacement of any of the springs in either direction. The springs 7 and 8 are placed in pairs one on each side of the tire, within the same, and are crossed as illustrated, the said springs being hooked obliquely and oppositely to and between the several pairs of fittings 14 and 17. Thus, for instance (looking at Fig. 1 of the drawings), the spring 7 on the left of the uppermost radial spring 6 will be hooked by its upper end to the fitting 17 and by its lower end to the fitting 14 farther on the left, whereas the spring 8 on the same side will be secured at its lower end to the fitting 14 and at its upper end to the fitting 17, and so on for the other lateral springs throughout the tire.

The outer metallic band 5 is applied in two or more sections, which are riveted or bolted to the outer fittings or plates 17 and are otherwise suitably joined together. This band is flanged over the inner one, as at 26, 27, and thus made to inclose and protect the various springs aforesaid, sufficient space and play being provided for between the two pairs of flanges 12, 13, and 26, 27, and their respective bands to allow for the proper compression of the radial springs under the heaviest loads. Other flanges 28 and 29 are formed on the outer periphery of the band 5, which afford a convenient retaining means for the cushioning band of rubber 9, although the latter may be shrunk on, if preferred. And the latter-named band 9 may be ribbed lengthwise and crosswise, or pitted or rough surfaced, to prevent sliding, and it may also be of other material than rubber, for example, leather or any suitable substitute.

It will be readily seen that when a set of tires of the improved type above described are placed on the wheels of a vehicle, the weight of the vehicle and load thereon will cause compression of the radial springs 6 that are at the bottom of each wheel, and corresponding distention of those at the top, while the inner band or rim 4 will move up and down within the outer one, and the lateral springs 7 and 8 will have a tendency to hold the radial springs at the sides of the wheel in proper position, thereby equally distributing the strain throughout the circumference of the wheel.

Having thus described my invention, what I claim, and desire to secure by Letters Patent of the United States, is:

1. A wheel tire comprising concentric bands, one embracing and radially movable over the other and one of said bands fixed to the wheel, circumferentially arranged springs radially seated within and between said bands, fittings secured between said springs and said bands and provided with lugs at each corner, and two sets of diagonally-disposed springs arranged side by side between each two of said radial springs and connected at their opposite ends with said lugs from the upper corner of one fitting to the lower corner of the other fitting.

2. A wheel tire comprising two circular bands flanged one over the other, an annular series of spiral springs radially seated within said bands, fittings on the ends of said springs and having lugs at each corner, means for anchoring the springs to the fittings, pairs of diagonally-disposed springs arranged side by side between said radial springs and running obliquely in opposite directions, and means for securing said diagonal springs to said fittings and for engaging said lugs on opposite sides thereof.

In testimony whereof I affix my signature in the presence of two subscribing witnesses.

THOMAS JAMES McCARTHY.

Witnesses:
ALFRED J. O'NEILL,
J. E. McGRATH.